US006757820B2

United States Patent
Sudharsanan et al.

(10) Patent No.: US 6,757,820 B2
(45) Date of Patent: Jun. 29, 2004

(54) DECOMPRESSION BIT PROCESSING WITH A GENERAL PURPOSE ALIGNMENT TOOL

(75) Inventors: Subramania Sudharsanan, San Jose, CA (US); Jeffrey Meng Wah Chan, Mountain View, CA (US); Marc Tremblay, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/356,437

(22) Filed: Jan. 31, 2003

(65) Prior Publication Data

US 2003/0120904 A1 Jun. 26, 2003

Related U.S. Application Data

(63) Continuation of application No. 09/442,874, filed on Nov. 18, 1999, now abandoned.

(51) Int. Cl.$^7$ .............................................. G06F 9/308
(52) U.S. Cl. ....................... 712/300; 712/221; 712/223; 712/224
(58) Field of Search ................................. 712/223, 224, 712/221, 300

(56) References Cited

U.S. PATENT DOCUMENTS

| | | | |
|---|---|---|---|
| 3,833,887 A | * 9/1974 | Shevlin | ...................... 358/400 |
| 4,785,393 A | 11/1988 | Chu et al. | |
| 5,295,250 A | 3/1994 | Komoto et al. | |
| 5,357,620 A | 10/1994 | Suzuki | |
| 5,381,452 A | * 1/1995 | Kowalski | ...................... 377/26 |
| 5,568,624 A | 10/1996 | Sites et al. | |
| 5,654,806 A | 8/1997 | Truong | |
| 5,669,012 A | 9/1997 | Shimizu et al. | |

(List continued on next page.)

FOREIGN PATENT DOCUMENTS

| | | |
|---|---|---|
| EP | 0 831 396 | 3/1998 |
| WO | WO 00/31623 | 6/2000 |

OTHER PUBLICATIONS

U.S. patent application Ser. No. 09/442,874, filed Nov. 18, 1999, entitled "Decompression Bit Processing with a General Purpose Alignment Tool," naming inventors Subramania Sudharsanan, Jeffrey Meng Wah Chan and Marc Tremblay, 29 pp.

(List continued on next page.)

Primary Examiner—William M. Treat
(74) Attorney, Agent, or Firm—Zagorin, O'Brien & Graham, LLP

(57) ABSTRACT

A method and apparatus for performing single-instruction bit field extraction and for counting a number of leading zeros in a sequence of bits on a general purpose processor are provided. The fast bit extraction operations are accomplished by executing a first instruction for extracting an arbitrary number of bits of a sequence of bits stored in two or more source registers of the processor starting at an arbitrary offset and the storing the extracted bits in a destination register. Both the source and the destination registers are specified by the instruction. In addition, a second instruction is provided for counting the number of leading zeros in a sequence of bits stored in two or more source registers of the processor and then storing a binary value representing the number of leading zeros in a destination register. Again the source and the destination registers are specified by the second instruction. Both the first and the second instructions are pipelined to obtain an effective throughput of one instruction every cycle, respectively. As a result, bit extraction operations are performed very efficiently by the processor, thereby reducing the overall processing time required to compress and decompress multimedia data.

28 Claims, 10 Drawing Sheets

| 00100110110 | RD | RS1 | RS2 |
|---|---|---|---|

| 00101110110 | RD | RS1 | immediate |
|---|---|---|---|

U.S. PATENT DOCUMENTS

| | | | |
|---|---|---|---|
| 5,835,793 A | | 11/1998 | Li et al. |
| 5,841,379 A | * | 11/1998 | Seshan et al. ................ 341/63 |
| 5,844,826 A | | 12/1998 | Nguyen |
| 5,923,574 A | | 7/1999 | Bechade |
| 5,931,896 A | | 8/1999 | Kawaguchi |
| 5,974,432 A | | 10/1999 | Orup |
| 5,996,066 A | | 11/1999 | Yung |
| 6,041,092 A | * | 3/2000 | Tsai et al. ...................... 377/1 |
| 6,052,522 A | | 4/2000 | Mattela et al. |
| 6,065,028 A | | 5/2000 | Dhong et al. |
| 6,173,300 B1 | | 1/2001 | Mahurin |
| 6,247,112 B1 | | 6/2001 | Seki |
| 6,308,253 B1 | | 10/2001 | Gadre et al. |

OTHER PUBLICATIONS

From the internet, *www.motorola.com*, *MPCxxx Instruction Set*, Sep. 1997 (4 pages).

Motorola, Inc. and International Business Machines Corp., *PowerPC Microprocessor Family: The Programming Environments*, 1997 (3 pages).

* cited by examiner

| OPCODE | RD | RS1 | RS2 |
|--------|----|----|-----|
| OPCODE | RD | RS1 | immediate |

FIG. 3A

| 00100111000 | RD | RS1 | RS2 |
|-------------|----|----|-----|

FIG. 3B

| OPCODE | RD | RS1 | RS2 |
|--------|----|----|-----|
| OPCODE | RD | RS1 | immediate |

FIG. 6A

| 00100110110 | RD | RS1 | RS2 |
|-------------|----|----|-----|

FIG. 6B

| 00101110110 | RD | RS1 | immediate |
|-------------|----|----|-----------|

DECOMPRESSION BIT PROCESSING WITH A GENERAL PURPOSE ALIGNMENT TOOL

This application is a Continuation of and claims priority from application Ser. No. 09/442,874 filed Nov. 18, 1999, now abandoned, the entirety of which is incorporated herein by reference.

BACKGROUND OF THE INVENTION

1. Field of the Invention

The present invention relates generally to processors and, more particularly to instructions for use with processors.

2. Related Art

In order to support speech, audio, 3D-graphics and video compression and decompression, processors must be able to support a variety of operations such as bit extraction, digital signal processing (DSP) and image display. As the demand for faster rendering of high resolution images rises, hardware acceleration of these operations becomes more and more important. Prior art processors, however, have focused on DSP and signal display operations while providing only limited support for bit extraction operations.

On the other hand, when dealing with encoded multimedia data such as H.261, H.265, MPEG-1, MPEG-2 or MPEG-4 data, as much as 50% of the processing time may be spent on bit extraction operations. As a result, there is a need for a general purpose processor that allows for fast processing of bit extraction operations.

SUMMARY OF THE INVENTION

The present invention provides a method and apparatus for performing fast bit extraction operations in a general purpose processor. The fast bit extraction operations are accomplished by executing a first instruction for extracting an arbitrary number of bits of a sequence of bits stored in two or more source registers of the processor starting at an arbitrary offset and the storing the extracted bits in a destination register. Both the source and the destination registers are specified by the instruction. In addition, a second instruction is provided for counting the number of leading zeros in a sequence of bits stored in two or more source registers of the processor and then storing a binary value representing the number of leading zeros in a destination register. Again the source and the destination registers are specified by the second instruction.

Both the first and the second instructions are pipelined to obtain an effective throughput of one instruction every cycle. As a result, bit extraction operations are performed very efficiently by the processor, thereby reducing the overall processing time required to compress and decompress multimedia data. The bit extraction instruction can also be used as an instruction to obtain unaligned data.

BRIEF DESCRIPTION OF THE DRAWINGS

FIG. 3A is a block diagram showing instruction formats for three-operand instructions supported by the processor of FIG. 1B.

FIG. 3B is a block diagram showing an instruction format for a bit extract instruction supported by the processor of FIG. 1B.

FIG. 6A is a block diagram of showing instruction formats for three-operand instructions supported by the processor of FIG. 1B.

FIGS. 6B and 6C are block diagrams showing instruction formats for a count consecutive clear bits (cccb) instruction supported by the processor of FIG. 1B.

FIGS. 8A and 8B are block diagrams illustrating a count consecutive clear bits operation performed on the processor of FIG. 1B.

DETAILED DESCRIPTION OF THE INVENTION

A processor in accordance to the principles of the resent invention is illustrated in FIG. 1.

Figure 1A:
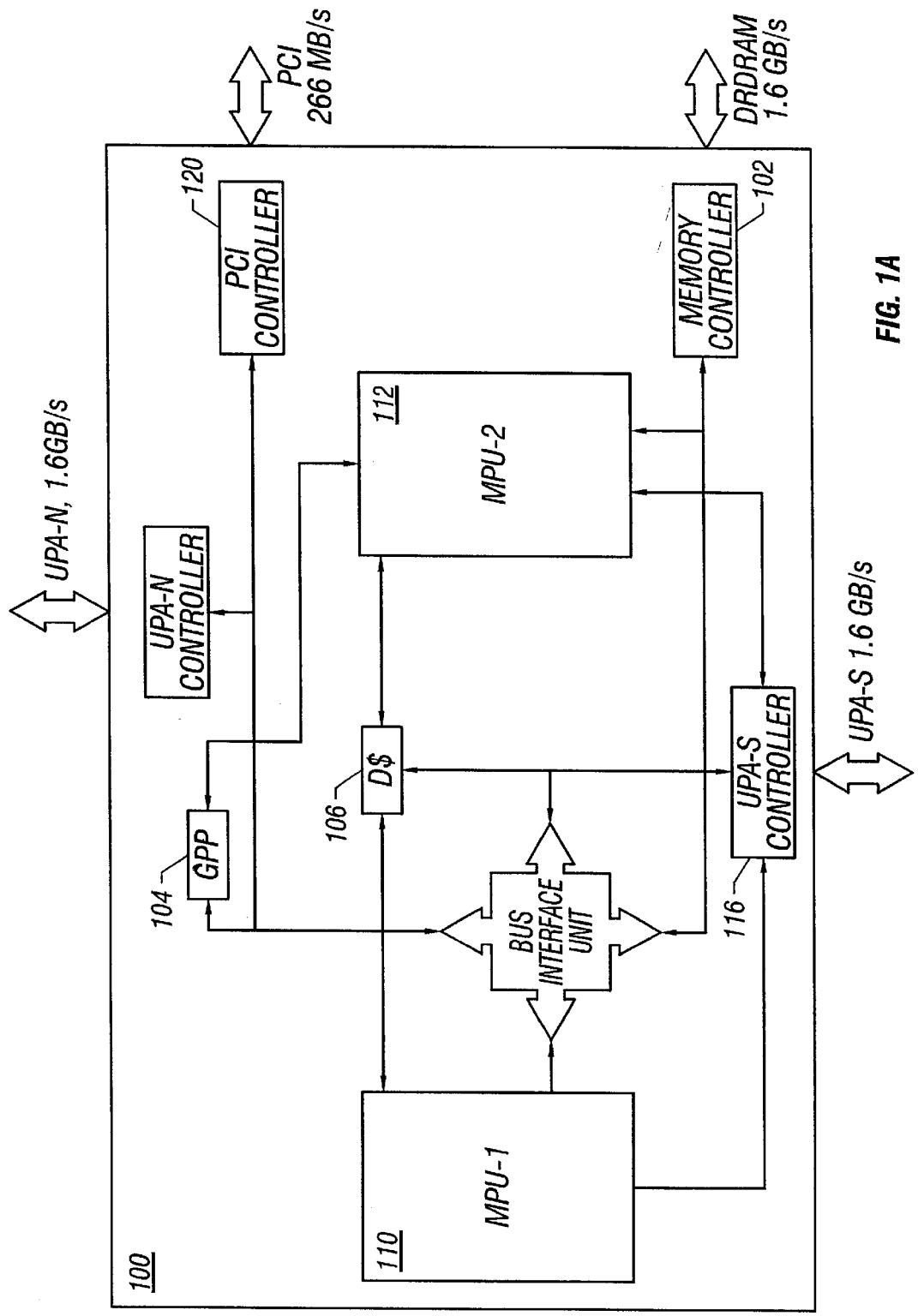
FIG. 1A is a schematic block diagram illustrating a single integrated circuit chip implementation of a processor in accordance with an embodiment of the present invention.

Referring to FIG. 1A, a schematic block diagram illustrates a single integrated circuit chip implementation of a processor 100 that includes a memory interface 102, a geometry decompressor 104, two media processing units 110 and 112, a shared data cache 106, and several interface controllers. The interface controllers support an interactive graphics environment with real-time constraints by integrating fundamental components of memory, graphics, and input/output bridge functionality on a single die. The components are mutually linked and closely linked to the processor core with high bandwidth, low-latency communication channels to manage multiple high-bandwidth data streams efficiently and with a low response time. The interface controllers include a an UltraPort Architecture Interconnect (UPA) controller 116 and a peripheral component interconnect (PCI) controller 120. The illustrative memory interface 102 is a direct Rambus dynamic RAM (DRDRAM) controller. The shared data cache 106 is a dual-ported storage that is shared among the media processing units 110 and 112 with one port allocated to each media processing unit. The data cache 106 is four-way set associative, follows a write-back protocol, and supports hits in the fill buffer (not shown). The data cache 106 allows fast data sharing and eliminates the need for a complex, error-prone cache coherency protocol between the media processing units 110 and 112. The UPA controller 116 provides a high speed interconnect 64-bit wide bus at 200 Mhz.

Two media processing units 110 and 112 are included in a single integrated circuit chip to support an execution environment exploiting thread level parallelism in which two independent threads can execute simultaneously. The threads may arise from any sources such as the same application, different applications, the operating system, or the runtime environment. Parallelism is exploited at the thread level since parallelism is rare beyond four, or even two, instructions per cycle in general purpose code. For example, the illustrative processor 100 is an eight-wide machine with eight execution units for executing instructions. A typical "general-purpose" processing code has an instruction level parallelism of about two so that, on average, most (about six) of the eight execution units would be idle at any time. The illustrative processor 100 employs thread level parallelism and operates on two independent threads, possibly attaining twice the performance of a processor having the same resources and clock rate but utilizing traditional non-thread parallelism.

Although the processor 100 shown in FIG. 1A includes two processing units on an integrated circuit chip, the architecture is highly scaleable so that one to several closely-coupled processors may be formed in a message-based coherent architecture and resident on the same die to process multiple threads of execution. Thus, in the processor 100, a limitation on the number of processors formed on a single die thus arises from capacity constraints of integrated circuit technology rather than from architectural constraints relating to the interactions and interconnections between processors.

Figure 1B:
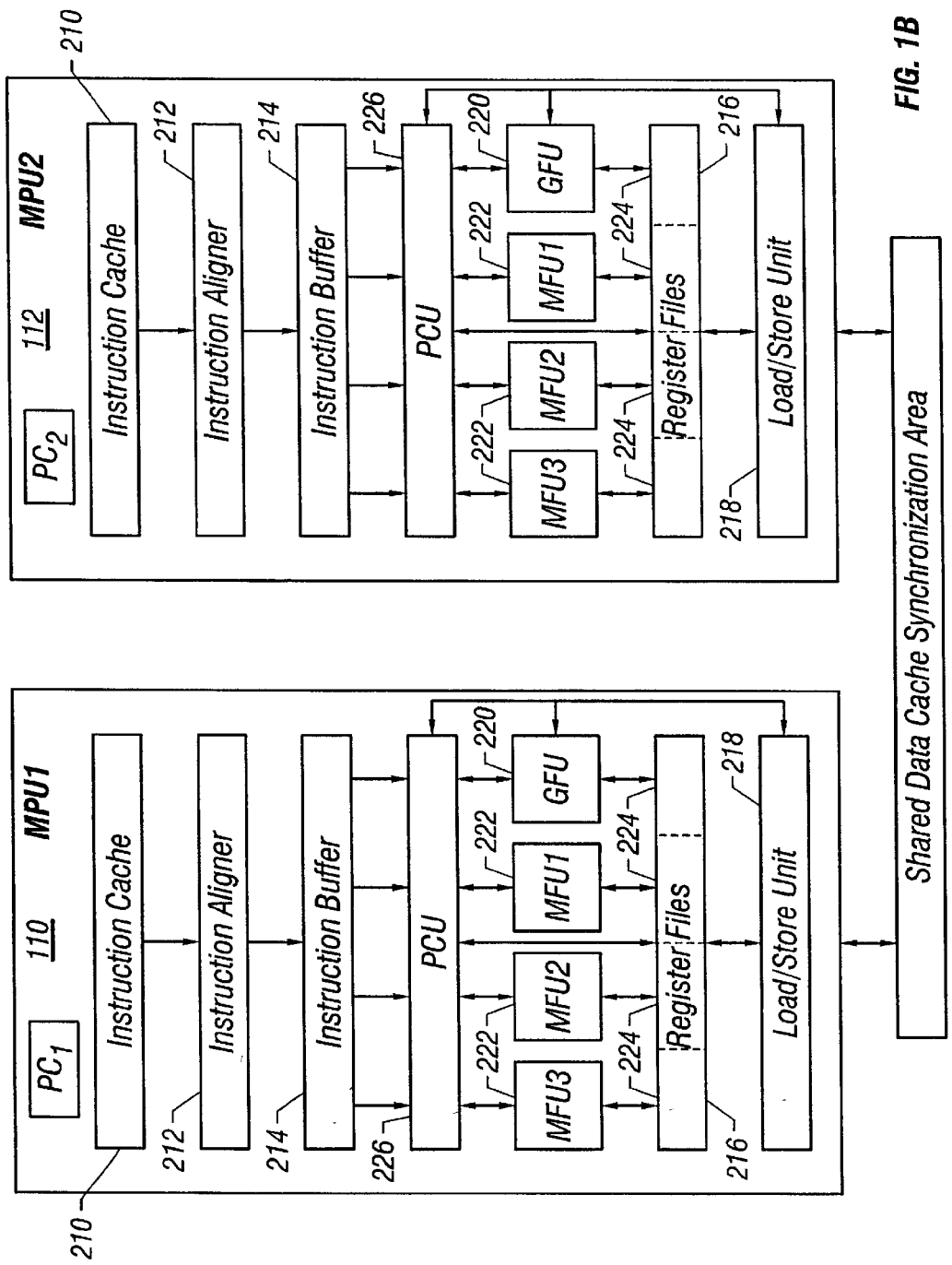
FIG. 1B is a schematic block diagram showing the core of the processor.

Referring to FIG. 1B, a schematic block diagram shows the core of the processor 100. The media processing units 110 and 112 each include an instruction cache 210, an instruction aligner 212, an instruction buffer 214, a pipeline control unit 226, a split register file 216, a plurality of execution units, and a load/store unit 218. In the illustrative processor 100, the media processing units 110 and 112 use a plurality of execution units for executing instructions. The execution units for a media processing unit 110 include three media functional units (MFU) 222 and one general functional unit (GFU) 220. The media functional units 222 are multiple single-instruction-multiple-data (MSIMD) media functional units. Each of the media functional units 222 is capable of processing parallel 16-bit components. Various parallel 16-bit operations supply the single-instruction-multiple-data capability for the processor 100 including add, multiply-add, shift, compare, and the like. The media functional units 222 operate in combination as tightly-coupled digital signal processors (DSPs). Each media functional unit 222 has a separate and individual sub-instruction stream, but all three media functional units 222 execute synchronously so that the subinstructions progress lock-step through pipeline stages.

The general functional unit 220 is a RISC processor capable of executing arithmetic logic unit (ALU) operations, loads and stores, branches, and various specialized and esoteric functions such as parallel power operations, reciprocal squareroot operations, and many others. The general functional unit 220 supports less common parallel operations such as the parallel reciprocal square root instruction.

The illustrative instruction cache 210 has a 16 Kbyte capacity and includes hardware support to maintain coherence, allowing dynamic optimizations through self-modifying code. Software is used to indicate that the instruction storage is being modified when modifications occur. The 16K capacity is suitable for performing graphic loops, other multimedia tasks or processes, and general-purpose Java™ code. Coherency is maintained by hardware that supports write-through, non-allocating caching. Self-modifying code is supported through explicit use of "store-to-instruction-space" instructions store2i. Software uses the store2i instruction to maintain coherency with the instruction cache 210 so that the instruction caches 210 do not have to be snooped on every single store operation issued by the media processing unit 110.

The pipeline control unit 226 is connected between the instruction buffer 214 and the functional units and schedules the transfer of instructions to the functional units. The pipeline control unit 226 also receives status signals from the functional units and the load/store unit 218 and uses the status signals to perform several control functions. The pipeline control unit 226 maintains a scoreboard, generates stalls and bypass controls. The pipeline control unit 226 also generates traps and maintains special registers.

Each media processing unit 110 and 112 has a register set of up to 224 logical thirty-two bit registers.

The media processing units 110 and 112 are highly structured computation blocks that execute software-scheduled data computation operations with fixed, deterministic and relatively short instruction latencies, operational characteristics yielding simplification in both function and cycle time. The operational characteristics support multiple instruction issue through a pragmatic very large instruction word (VLIW) approach that avoids hardware interlocks to account for software that does not schedule operations properly. Such hardware interlocks are typically complex, error-prone, and create multiple critical paths. A VLIW instruction word always includes one instruction that executes in the general functional unit (GFU) 220 and from zero to three instructions that execute in the media functional units (MFU) 222. A MFU instruction field within the VLIW instruction word includes an operation code (opcode) field, two or three source register (or immediate) fields, and one destination register field.

Instructions are executed in-order in the processor 100 but loads can finish out-of-order with respect to other instructions and with respect to other loads, allowing loads to be moved up in the instruction stream so that data can be streamed from main memory. The execution model eliminates the usage and overhead resources of an instruction window, reservation stations, a re-order buffer, or other blocks for handling instruction ordering. Elimination of the instruction ordering structures and overhead resources is highly advantageous since the eliminated blocks typically consume a large portion of an integrated circuit die. For example, the eliminated blocks consume about 30% of the die area of a Pentium II processor.

The processor 100 supports full bypasses between the first two execution units within the media processing unit 110 and 112 and has a scoreboard in the general functional unit 220 for load operations so that the compiler does not need to handle nondeterministic latencies due to cache misses. The processor 100 scoreboards long latency operations that are executed in the general functional unit 220, for example a reciprocal square-root operation, to simplify scheduling across execution units. The scoreboard (not shown) operates by tracking a record of an instruction packet or group from the time the instruction enters a functional unit until the instruction is finished and the result becomes available. A VLIW instruction packet contains one GFU instruction and from zero to three MFU instructions. The source and destination registers of all instructions in an incoming VLIW instruction packet are checked against the scoreboard. Any true dependencies or output dependencies stall the entire packet until the result is ready. Use of a scoreboarded result as an operand causes instruction issue to stall for a sufficient number of cycles to allow the result to become available. If the referencing instruction that provokes the stall executes on the general functional unit 220 or the first media functional unit 222, then the stall only endures until the result is available for intra-unit bypass. For the case of a load instruction that hits in the data cache 106, the stall may last only one cycle. If the referencing instruction is on the second or third media functional units 222, then the stall endures for one extra cycle to allow time for transmission.

The scoreboard automatically manages load delays that occur during a load hit. In an illustrative embodiment, all loads enter the scoreboard to simplify software scheduling and eliminate NOPs in the instruction stream.

The scoreboard is used to manage most interlocks between the general functional unit 220 and the media functional units 222. All loads and non-pipelined long-latency operations of the general functional unit 220 are scoreboarded. The long-latency operations include division idiv, fdiv instructions, reciprocal squareroot frecsqrt, precsqrt instructions, and power ppower instructions. None of the results of the media functional units 222 is scoreboarded. Non-scoreboarded results are available to subsequent operations on the functional unit that produces the results following the latency of the instruction.

Figure 2A:
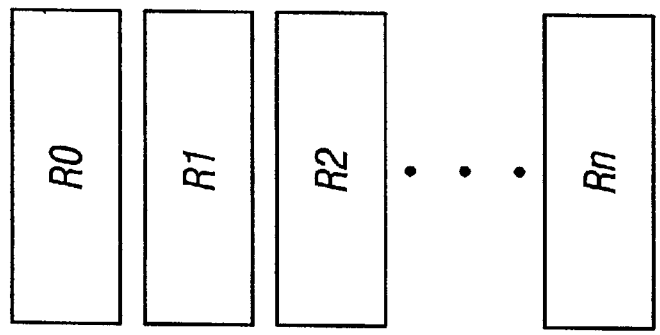
FIG. 2A is a block diagram of a register file of the processor of FIG. 1B.
Figure 2B:
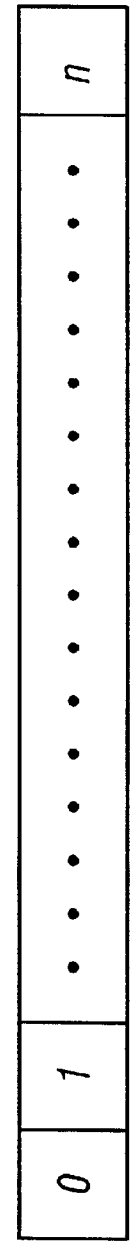
FIG. 2B is a block diagram of a register of the register file of FIG. 2A.

The structure of a register file of the processor of FIG. 1B is illustrated in FIG. 2A. The register file is made up of an arbitrary number of registers R0, R1, R2 . . . Rn. Each of registers R0, R1, R2 . . . Rn, in turn has an arbitrary number of bits n, as shown in FIG. 2B. In one embodiment, the number of bits in each of registers R0, R1, R2 . . . Rn is 32. However, those skilled in the art realize that the principles of the present invention can be applied to an arbitrary number of registers each having an arbitrary number of bits. Accordingly, the present invention is not limited to any particular number of registers or bits per register.

FIG. 3A illustrates two instruction formats for three-operand instructions supported by the processor of FIG. 1B. Each instruction format has an 11-bit opcode and three 7-bit operands. Bit 6 of the opcode indicates whether the third operand is a source register or an immediate value. The first of the operands is a reference to a destination register (RD) for the instruction. The second operand, in turn, is a reference to a first source register for the instruction (RS1). Finally, the third operand can be either a reference to a second register (RS2) or an immediate value to be used in the instruction.

Figure 4:
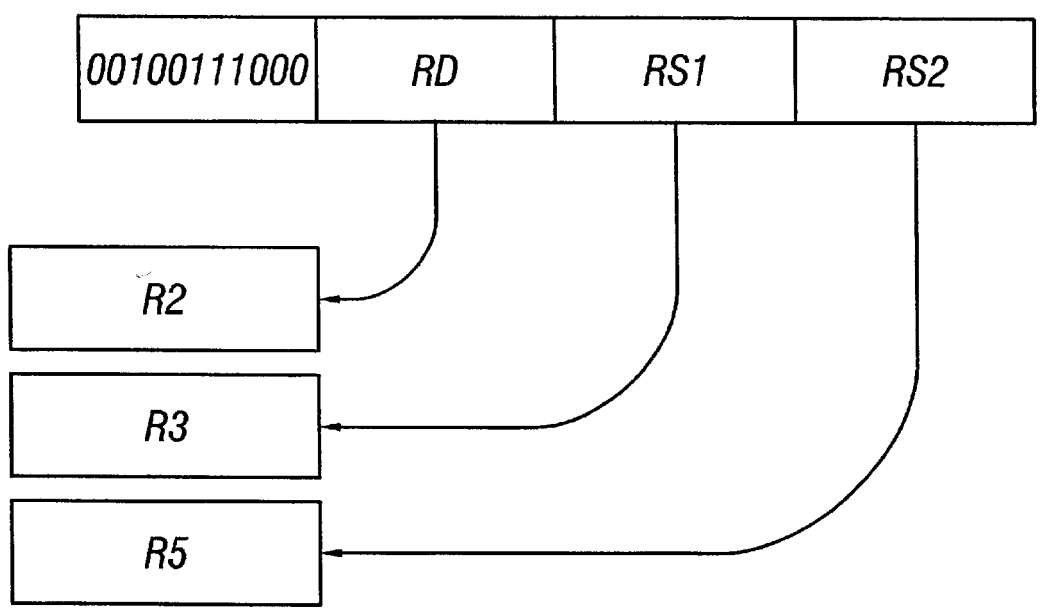
FIG. 4 is a block diagram showing the relationship between the instruction format of FIG. 3B and the register file of FIG. 2A.

FIG. 3B illustrates an instruction format for a bit extraction instruction (bit-extract) supported by the processor of FIG. 1B, in accordance to the present invention. The bit-extract instruction uses the first of the three-operand instruction formats of FIG. 3A, namely a format in which no immediate values are used. Rather, all operands are references to registers in the register file of the processor, as shown in FIG. 4. The RD operand represents a register of the register file in which the results of the bit extract operation are stored. The RS1 operand represents the first of two contiguous registers of the register file from which the data for the bit extract operation is read. The RS2 operand represents the register of the register file from which the length and position of the data to be extracted during the bit extraction operation are specified.

In FIG. 4, each of the operands of the bit-extract instruction refers to an arbitrary register of the register file of FIG. 2A in which the represented value is stored. For example, the operand RD contains a reference to the R2 register, the operand RS1 contains a reference to the R3 register and the operand RS2 contains a reference to the R5 register.

Figure 5A:
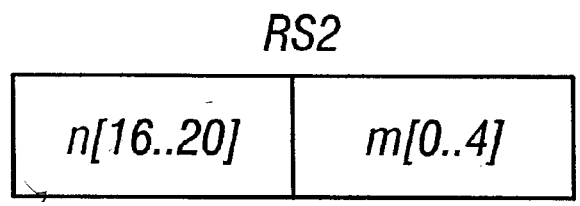
FIGS. 5A and 5B are block diagrams illustrating a bit extraction operation performed on the processor of FIG. 1B.
Figure 5B:
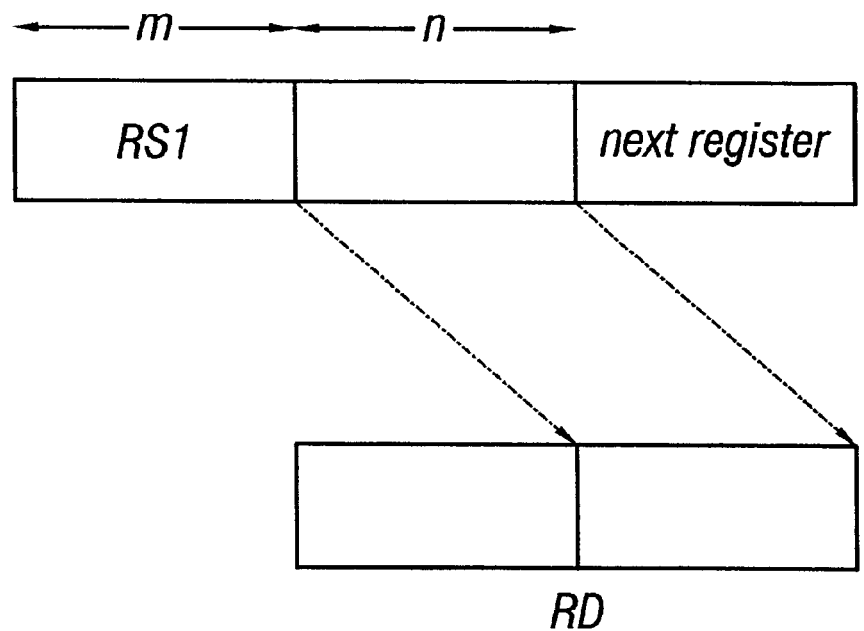

FIGS. 5A and 5B are block diagrams that illustrate the operation of the bit-extract instruction of FIG. 3B. As shown in FIG. 5B, the bit-extract operation copies an arbitrary number of bits n starting at an arbitrary position m within the concatenated contents of two contiguous-registers represented by RS1. As shown in FIG. 5A, the values of n and m are stored in consecutive bit positions of the register represented by RS2. In particular, in one embodiment, n is stored in bits 16–20 and m is stored in bits 0–4 of the registered represented by RS2.

Furthermore, to ensure that the bit-extract instruction functions properly, m is required to be less than the total number of bits t in one of the source registers and n is required to be less than or equal to t. Thus, in the case where two source registers are concatenated and each of these registers has 32 bits, m<32 and n<=32. While a two source register implementation is described, those skilled in the art realize that the principles of the present invention can be applied to instructions having an arbitrary number of source registers. Accordingly, the present invention is not limited to any particular number of source registers.

FIG. 6A illustrates two instruction formats for three-operand instructions supported by the processor of FIG. 1B. Each instruction format has an 11-bit opcode and three 7-bit operands. Bit 6 of the opcode indicates whether the third operand is a source register or an immediate value. The first of the operands is a reference to a destination register (RD) for the instruction. The second operand, in turn, is a reference to a first source register for the instruction (RS1). Finally, the third operand can be either a reference to a second register (RS2) or an immediate value to be used in the instruction.

Figure 7A:
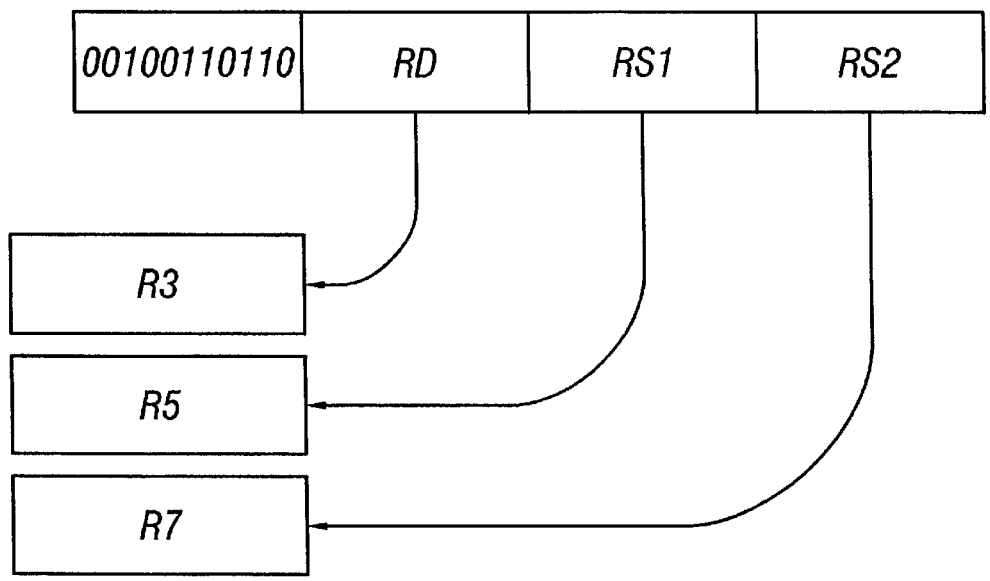
FIGS. 7A and 7B are block diagrams showing the respective relationship between the instruction formats of FIGS. 6B and 6C and the register file of FIG. 2A.
Figure 7B:
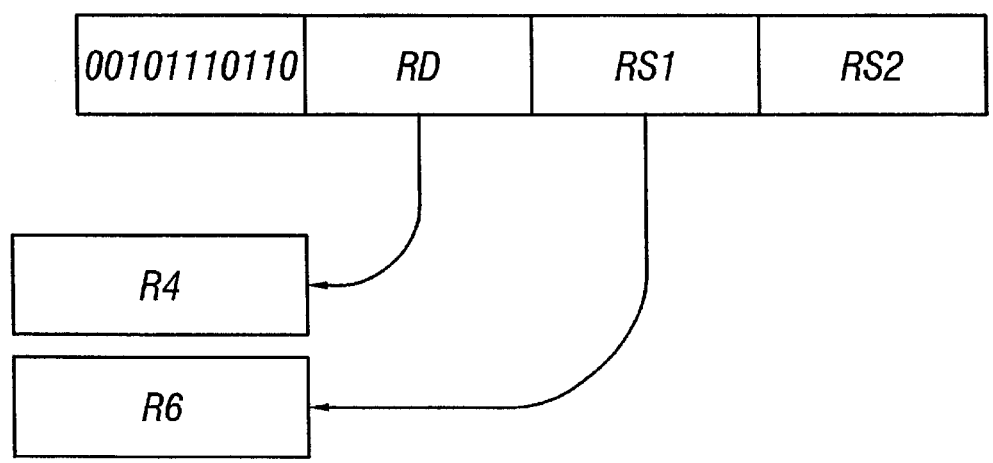

FIG. 6B illustrates an instruction format for a count consecutive clear bits instruction (cccb) supported by the processor of FIG. 1B, in accordance to the present invention. The cccb instruction uses either of the three-operand instruction formats of FIG. 6A, as shown in FIGS. 6B and 6C respectively. In the cccb instruction of FIG. 6B, all operands are references to registers in the register file of the processor, as shown in FIG. 7A. In the cccb instruction of FIG. 6C, all operands are references to registers in the register file of the processor except for the last operand which is an immediate value, as shown in FIG. 7B. The RD operand represents a register of the register file in which the results of the count consecutive clear bits operation are stored. The RS1 operand represents the register of the register file from which the data for the count consecutive clear bits operation is read. The RS2 operand represents the register of the register file in which the starting bit position from which the consecutive clear bits count in register RS1 is kept.

Again, each of the operands of the cccb instruction of FIG. 7A refers to an arbitrary register in the register file in which the represented value is stored. For example, the operand RD contains a reference to the R3 register, the operand RS1 contains a reference to the R5 register and the operand RS2 contains a reference to the R7 register in the register file.

Figures 8A, 8B:
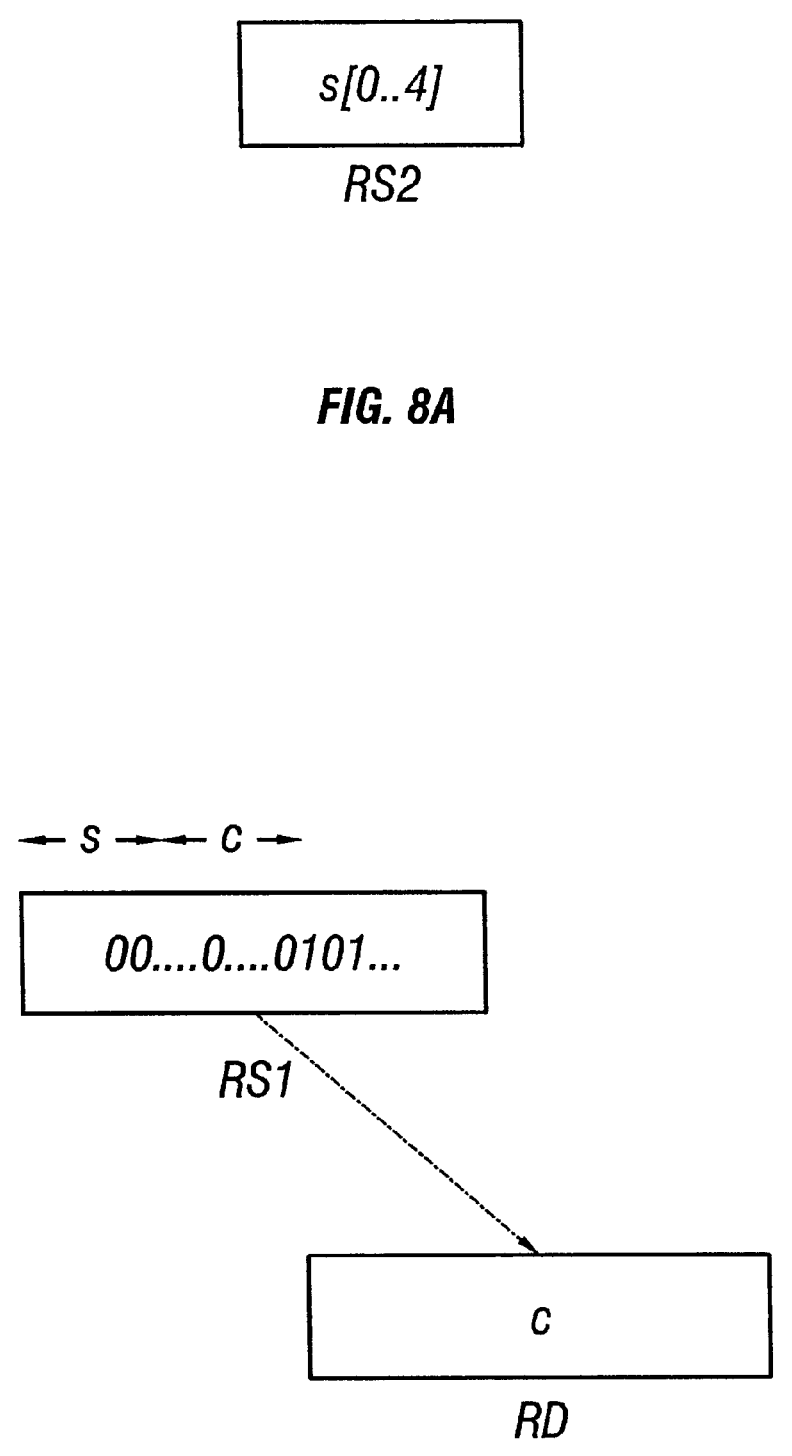

FIGS. 8A and 8B illustrate the operation of the cccb instruction of FIG. 6B. As shown in FIG. 8B, the cccb instruction determines a number of consecutive leading zeros in the register represented by RS1 starting at an arbitrary bit position s. The value of s is stored in the register represented by RS2. To ensure that the cccb instruction performs correctly, the value of s is required to be less than the total number of bits in the register represented by RS1 and each of the s bits that are skipped must be a zero. Thus, in the case where RS1 is 32 bits wide, s<=32.

Figure 9:
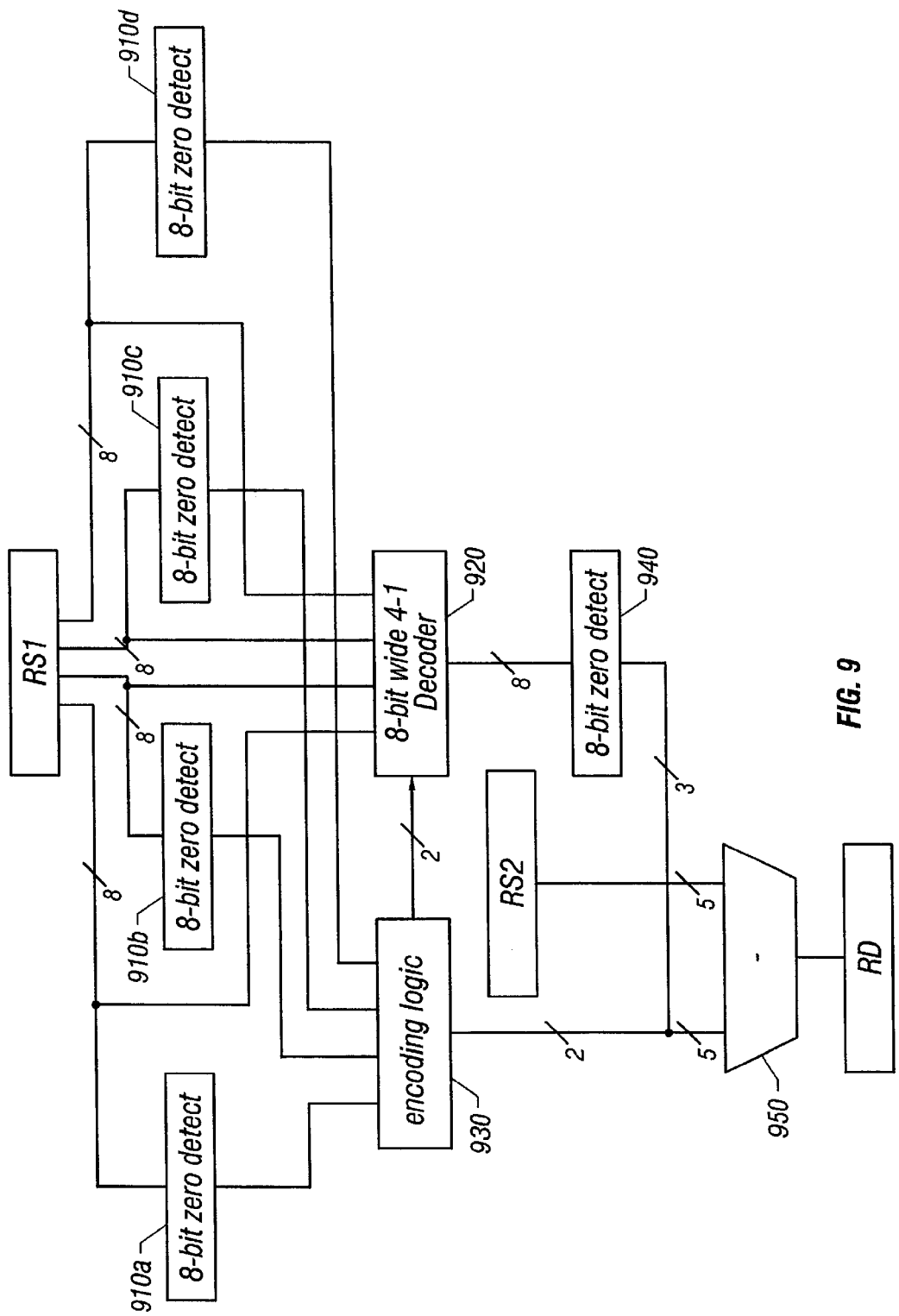
FIG. 9 is a block diagram of one implementation of the circuitry within MFUs 222 of the processor of FIG. 1B for performing the cccb operation.

FIG. 9 is a block diagram of one implementation of the circuitry within MFUs 222 of the processor of FIG. 1B for performing the cccb operation. In FIG. 9, the value stored in the register represented by RS1 are supplied in groups of 8-bits to respective input ports of four 8 bit zero detect circuits 910n (where n=A, B, C, D), as well as to respective input ports of an 8-bit wide decoder 920. Output ports of 8 bit zero detect circuits 910n are connected to respective input ports of encoding logic circuit 930. Encoding logic circuit 930, in turn, has two 2-bit wide output ports connected respectively to the 2 MSBs of subtractor 950 and to an enable port of 8-bit wide decoder 920. An output port of 8-bit wide decoder 920 is connected to an input port of 8 bit zero detect circuit 940. An output port of 8 bit zero detect circuit 940 is, in turn, connected to the 3 LSBs of the input port of subtractor 950 connected to the output port of encoding logic circuit 930. The 5 LSBs of the value stored in the register represented by RS2 are supplied on a second input port of subtractor 950. Finally, the value on an output port of subtractor 950 is stored in the register represented by RD.

The operation of the cccb instruction of FIG. 6C is analogous to that of the cccb instruction of FIG. 6B except that the value s is supplied directly as part of the instruction as an immediate value. While a single source register implementation is described, those skilled in the art realize that the principles of the present invention can be applied to instructions having an arbitrary number of source registers. Accordingly, the present invention is not limited to any particular number of source registers.

Finally, bit-extract and cccb instructions can be combined to perform efficient bit extraction operations using the processor of FIG. 1B.

Java is a trademark of Sun Microsystems, Inc. of Mountain View Calif.

Embodiments described above illustrate but do not limit the invention. In particular, the invention is not limited by any number of registers or immediate values specified by the instructions. In addition, the invention is not limited to any particular hardware implementation. Those skilled in the art realize that alternative hardware implementation can be employed in lieu of the one described herein in accordance to the principles of the present invention. Other embodiments and variations are within the scope of the invention, as defined by the following claims.

What is claimed is:

1. A method of operating a processor comprising:
   in response to a single instruction executable by the processor, counting consecutive same-value encoding positions in a set of one or more source registers, wherein a start position for the counting is identifiable using an operand of the instruction.

2. The method of claim 1, wherein the source registers are concatenated.

3. The method of claim 1, wherein a value representing the start position for counting is stored in one of the source registers identifiable by the operand of the instruction.

4. The method of claim 1, wherein a value representing the start position for counting is specified as an immediate field in the operand of the instruction.

5. The method of claim 1, wherein the set of one or more source registers is identifiable by the operand of the instruction.

6. The method of claim 1, wherein the consecutive same-value encoding positions are bit positions in the source registers.

7. The method of claim 1, further comprising:
   storing a value representing the number of consecutive same-value encoding positions in at least one destination register.

8. The method of claim 6, wherein the destination register is identifiable by the operand of the instruction.

9. The method of claim 6, wherein the source and the destination registers are interchangeable.

10. The method of claim 1, wherein the processor is pipelined and the instruction is executed with a throughput of one instruction per cycle.

11. A processor comprising:
    a register file; and
    at least one execution unit coupled to the register file and configured to count consecutive same-value encoding positions in a set of one or more source registers in the register file, in response to a single instruction executable by the processor, wherein a start position for the counting is identifiable using an operand of the instruction.

12. The processor of claim 11, wherein the source registers are concatenated in the register file.

13. The processor of claim 11, wherein a value representing the start position for counting is stored in one of the source registers identifiable by the operand of the instruction.

14. The processor of claim 11, wherein a value representing the start position for counting is specified as an immediate field in the operand of the instruction.

15. The processor of claim 11, wherein the set of one or more source registers in the register file is identifiable by the operand of the instruction.

16. The processor of claim 11, wherein the consecutive same-value encoding positions are bit positions in the source registers.

17. The processor of claim 11, wherein the execution unit is further configured to store a value representing the number of consecutive same-value encoding positions in at least one destination register.

18. The processor of claim 17, wherein the destination register in the register file is identifiable by the operand of the instruction.

19. The processor of claim 17, wherein the source and the destination registers are interchangeable in the register file.

20. The processor of claim 11, wherein the processor is pipelined and the execution unit is further configured to execute instructions with a throughput of one instruction per cycle.

21. A processor comprising:
    means for counting consecutive same-value encoding positions, in a set of one or more source registers, in response to a single instruction executable by the processor, wherein a start position for the counting is identifiable using an operand of the instruction.

22. The processor of claim 21, further comprising:
    means for storing a value representing the number of consecutive same-value encoding positions in at least one destination register.

23. The processor of claim 21, further comprising:
    means for executing instructions with a throughput of one instruction per cycle.

24. A processor that executes an instruction set that includes an instruction that upon execution thereof, causes the processor to count consecutive same-value encoding positions beginning at an arbitrary position in a set of one or more source registers identifiable using an operand of the instruction.

25. The processor of claim 24, wherein a value representing the arbitrary position for counting is stored in one of the source registers identifiable by the operand of the instruction.

26. The processor of claim 24, wherein a value representing the arbitrary position for counting is specified as an immediate field in the operand of the instruction.

27. The processor of claim 24, wherein the consecutive same-value encoding positions are bit positions in the source registers.

28. The processor of claim 24, wherein upon execution thereof, the processor stores a value representing the number of consecutive same-value encoding positions in at least one destination register identifiable by the operand of the instruction.

* * * * *